(12) United States Patent
Patel et al.

(10) Patent No.: US 10,012,387 B2
(45) Date of Patent: Jul. 3, 2018

(54) FUEL SUPPLY SYSTEM FOR A GAS TURBINE ENGINE

(71) Applicant: General Electric Company, Schenectady, NY (US)

(72) Inventors: Nayan Vinodbhai Patel, Liberty Township, OH (US); Alfred Albert Mancini, Cincinnati, OH (US); Duane Douglas Thomsen, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 412 days.

(21) Appl. No.: 14/946,109

(22) Filed: Nov. 19, 2015

(65) Prior Publication Data

US 2016/0161123 A1 Jun. 9, 2016

Related U.S. Application Data

(60) Provisional application No. 62/088,108, filed on Dec. 5, 2014.

(51) Int. Cl.
*F02C 9/34* (2006.01)
*F02C 7/22* (2006.01)
(Continued)

(52) U.S. Cl.
CPC .............. *F23R 3/28* (2013.01); *F02C 7/224* (2013.01); *F02C 7/232* (2013.01); *F02C 7/262* (2013.01);
(Continued)

(58) Field of Classification Search
CPC .. F02C 7/22; F02C 7/222; F02C 7/228; F02C 9/34
See application file for complete search history.

(56) References Cited

U.S. PATENT DOCUMENTS 3,690,093 A * 9/1972 Carlisle ..................... F23R 3/36
239/400
3,910,035 A * 10/1975 Juhasz ...................... F23R 3/26
60/39.23

(Continued)

FOREIGN PATENT DOCUMENTS

| CA | 2595061 A1 | 1/2009 |
| EP | 2733424 A2 | 5/2014 |

(Continued)

OTHER PUBLICATIONS

Unofficial English Translation of Japanese Office Action issued in connection with corresponding JP Application No. 2015-234386 dated Nov. 1, 2016.

(Continued)

*Primary Examiner* — Lorne Meade
*Assistant Examiner* — Eric Linderman
(74) *Attorney, Agent, or Firm* — General Electric Company; Pamela Kachur

(57) ABSTRACT

In one aspect, a fuel supply system may include a fuel injector having a primary and a secondary pilot fuel nozzle in fluid communication with a primary and a secondary fuel circuit, respectively, and a main fuel nozzle in fluid communication with a main fuel circuit. The fuel injector may also define a by-pass fuel circuit connected between the primary circuit and the secondary circuit and/or the main circuit. The system may also include a primary fuel manifold configured to be fluidly connected to the primary pilot fuel nozzle via the primary fuel circuit. Moreover, the system may include a by-pass valve provided in operative association with the by-pass fuel circuit. The by-pass valve may be configured to be opened such that a portion of the fuel flowing through the primary circuit from the primary fuel (Continued)

manifold is directed to the secondary circuit and/or the main circuit.

13 Claims, 9 Drawing Sheets

(51) Int. Cl.
    *F23R 3/28*     (2006.01)
    *F02C 7/232*     (2006.01)
    *F02C 7/262*     (2006.01)
    *F23K 5/06*     (2006.01)
    *F02C 7/224*     (2006.01)

(52) U.S. Cl.
    CPC ............... *F02C 9/34* (2013.01); *F23K 5/06* (2013.01); *F02C 7/22* (2013.01); *F02C 7/222* (2013.01); *Y02T 50/671* (2013.01)

(56) References Cited

U.S. PATENT DOCUMENTS

| | | | | |
|---|---|---|---|---|
| 3,943,705 A * | 3/1976 | DeCorso | ............... | F23R 3/40 |
| | | | | 431/268 |
| 4,719,750 A * | 1/1988 | Lemmin | ............... | F02C 9/26 |
| | | | | 60/226.1 |
| 4,747,263 A | 5/1988 | Gerard et al. | | |
| 5,257,502 A * | 11/1993 | Napoli | ............... | F02C 7/228 |
| | | | | 60/739 |
| 5,261,222 A * | 11/1993 | Napoli | ............... | F02C 7/228 |
| | | | | 60/778 |
| 5,303,542 A * | 4/1994 | Hoffa | ............... | F23R 3/26 |
| | | | | 60/746 |
| 5,365,732 A * | 11/1994 | Correa | ............... | F02C 7/228 |
| | | | | 60/39.281 |
| 5,809,771 A | 9/1998 | Wernberg | | |
| 6,092,362 A * | 7/2000 | Nagafuchi | ............... | F02C 9/34 |
| | | | | 60/39.281 |
| 6,196,248 B1 | 3/2001 | Myers et al. | | |
| 6,250,065 B1 * | 6/2001 | Mandai | ............... | F02C 7/232 |
| | | | | 60/39.094 |
| 6,367,239 B1 * | 4/2002 | Brown | ............... | F01D 19/00 |
| | | | | 60/39.463 |
| 6,955,040 B1 | 10/2005 | Myers et al. | | |
| 7,431,015 B2 | 10/2008 | Mahoney et al. | | |
| 7,921,651 B2 | 4/2011 | Alexander et al. | | |
| 8,001,761 B2 | 8/2011 | Myers, Jr. et al. | | |
| 8,459,034 B2 * | 6/2013 | Snider | ............... | F02C 7/222 |
| | | | | 60/39.37 |
| 8,951,021 B2 | 2/2015 | Hutto, Jr. | | |
| 8,991,148 B2 | 3/2015 | Dore et al. | | |
| 9,103,284 B2 | 8/2015 | Erickson et al. | | |
| 9,291,098 B2 * | 3/2016 | Chen | ............... | F02C 3/22 |
| 2003/0144787 A1 * | 7/2003 | Davis, Jr. | ............... | F02C 7/228 |
| | | | | 701/100 |
| 2004/0250547 A1 * | 12/2004 | Mancini | ............... | F23D 11/107 |
| | | | | 60/740 |
| 2004/0255594 A1 * | 12/2004 | Baino | ............... | F02C 9/26 |
| | | | | 60/773 |
| 2005/0086944 A1 * | 4/2005 | Cowan | ............... | F23D 17/002 |
| | | | | 60/776 |
| 2005/0097895 A1 * | 5/2005 | Kothnur | ............... | F02C 7/222 |
| | | | | 60/776 |
| 2006/0016198 A1 * | 1/2006 | Stuttaford | ............... | F02C 7/22 |
| | | | | 60/776 |
| 2006/0090471 A1 * | 5/2006 | Shah | ............... | F02C 9/28 |
| | | | | 60/772 |
| 2006/0096164 A1 * | 5/2006 | Koh | ............... | C10L 1/003 |
| | | | | 44/600 |
| 2006/0107666 A1 * | 5/2006 | Kothnur | ............... | F02C 7/222 |
| | | | | 60/773 |
| 2007/0079593 A1 * | 4/2007 | Fujii | ............... | F02C 7/1435 |
| | | | | 60/39.27 |
| 2007/0089395 A1 * | 4/2007 | Fujii | ............... | F02C 9/263 |
| | | | | 60/39.281 |
| 2007/0119178 A1 * | 5/2007 | Berenbrink | ............... | F02C 9/34 |
| | | | | 60/773 |
| 2007/0271024 A1 * | 11/2007 | Fujii | ............... | F02C 9/28 |
| | | | | 701/100 |
| 2008/0001761 A1 | 1/2008 | Schwarz | | |
| 2008/0083223 A1 * | 4/2008 | Prociw | ............... | F02C 7/222 |
| | | | | 60/739 |
| 2008/0271456 A1 * | 11/2008 | Scully | ............... | F02C 7/228 |
| | | | | 60/740 |
| 2009/0272097 A1 * | 11/2009 | Lawson | ............... | F02C 3/22 |
| | | | | 60/39.463 |
| 2009/0272098 A1 * | 11/2009 | Lawson | ............... | F02C 3/22 |
| | | | | 60/39.463 |
| 2009/0272118 A1 * | 11/2009 | Alexander | ............... | F02C 3/22 |
| | | | | 60/772 |
| 2010/0051726 A1 * | 3/2010 | Houtman | ............... | F02C 7/222 |
| | | | | 239/548 |
| 2010/0263382 A1 | 10/2010 | Mancini et al. | | |
| 2010/0269508 A1 * | 10/2010 | Saito | ............... | F23R 3/14 |
| | | | | 60/748 |
| 2011/0167829 A1 * | 7/2011 | Scully | ............... | F02C 7/222 |
| | | | | 60/740 |
| 2012/0151897 A1 | 6/2012 | Kopecek et al. | | |
| 2012/0151930 A1 | 6/2012 | Patel et al. | | |
| 2012/0260663 A1 | 10/2012 | Pidcock | | |
| 2013/0042920 A1 | 2/2013 | Snodgrass et al. | | |
| 2013/0074945 A1 * | 3/2013 | Karaca | ............... | F02C 7/22 |
| | | | | 137/154 |
| 2013/0091824 A1 | 4/2013 | Murakami et al. | | |
| 2013/0097991 A1 * | 4/2013 | Zhang | ............... | F23K 5/06 |
| | | | | 60/39.59 |
| 2013/0098041 A1 * | 4/2013 | Zhang | ............... | F23K 5/005 |
| | | | | 60/734 |
| 2013/0180250 A1 * | 7/2013 | Harada | ............... | F02C 7/232 |
| | | | | 60/740 |
| 2014/0137558 A1 * | 5/2014 | Toronto | ............... | F02C 7/222 |
| | | | | 60/739 |
| 2014/0238041 A1 * | 8/2014 | Crothers | ............... | F02C 7/224 |
| | | | | 60/779 |
| 2015/0275755 A1 * | 10/2015 | Ogata | ............... | F02C 3/22 |
| | | | | 60/39.463 |
| 2015/0337730 A1 * | 11/2015 | Kupiszewski | ............... | F02C 3/22 |
| | | | | 60/39.465 |
| 2015/0337741 A1 * | 11/2015 | Gassner | ............... | F02C 6/003 |
| | | | | 60/780 |
| 2015/0377138 A1 * | 12/2015 | Crothers | ............... | F02C 7/22 |
| | | | | 60/776 |
| 2016/0177834 A1 * | 6/2016 | Patel | ............... | F02C 7/22 |
| | | | | 239/403 |
| 2016/0245524 A1 * | 8/2016 | Hill | ............... | F23R 3/346 |
| 2016/0273449 A1 * | 9/2016 | DiCintio | ............... | F23M 20/005 |
| 2016/0273775 A1 | 9/2016 | Griffiths et al. | | |
| 2016/0305276 A1 * | 10/2016 | Meisl | ............... | F01D 25/002 |
| 2016/0305667 A1 * | 10/2016 | Wolfe | ............... | B23P 15/00 |
| 2017/0030583 A1 * | 2/2017 | Fujii | ............... | F02C 7/20 |
| 2017/0089265 A1 * | 3/2017 | Gamero | ............... | F02C 7/222 |
| 2017/0219211 A1 * | 8/2017 | Kajimura | ............... | F02C 7/18 |
| 2017/0299190 A1 * | 10/2017 | Patel | ............... | F23R 3/36 |

FOREIGN PATENT DOCUMENTS

| | | |
|---|---|---|
| GB | 2451144 A | 1/2009 |
| JP | 2012132671 A | 7/2012 |
| WO | 9010147 A1 | 9/1990 |
| WO | 2012057282 A1 | 5/2012 |

OTHER PUBLICATIONS

European Search Report and Opinion issued in connection with corresponding EP Application No. 15197254.4 dated Apr. 13, 2016.

* cited by examiner

FUEL SUPPLY SYSTEM FOR A GAS TURBINE ENGINE

CROSS-REFERENCE TO RELATED APPLICATIONS

This non-provisional application claims the benefit of priority under 35 U.S.C. § 119(e) to U.S. Provisional Patent Application No. 62/088,108, entitled "FUEL SUPPLY SYSTEM FOR A GAS TURBINE ENGINE", filed Dec. 5, 2014, which is herein incorporated in its entirety by reference.

FIELD OF THE INVENTION

The present subject matter relates generally to a system for supplying fuel to the various fuel injectors contained within a combustor of a gas turbine engine and, more particularly, to a fuel supply system including a by-pass fuel circuit and an associated valve for diverting a portion of the fuel flowing through one internal fuel circuit of a fuel injector to another internal fuel circuit of the fuel injector.

BACKGROUND OF THE INVENTION

A gas turbine engine typically includes a plurality of fuel injectors for supplying fuel to a combustor of the engine. The fuel is introduced at the upstream end of the combustor in a highly atomized spray from a fuel nozzle assembly of each fuel injector. Compressed air flows around the fuel nozzle assembly and mixes with the fuel to form a fuel-air mixture, which is then combusted within a combustion zone of the combustor.

Due to a wide range of combustor operating conditions and corresponding required fuel flows, many fuel injectors include a main nozzle and one or more pilot nozzles. For example, fuel injectors are known that include both a primary pilot nozzle and a secondary pilot nozzle. Typically, the pilot nozzles are used during start-up, with both the pilot and main nozzles being used during higher power operation. For example, the flow to the main nozzles may be reduced or cut-off during start-up and lower power operation. Such fuel injectors are typically more efficient and cleaner-burning than single nozzle fuel injectors, as the fuel flow can be more accurately controlled and the fuel spray more accurately directed for the particular combustor requirements.

During certain operating events, it is often necessary to supply an enriched fuel flow to one or more of the fuel injectors to satisfy the operational requirements of the gas turbine engine. For example, to relight an engine following a high-power fuel cut (HPFC), conventional fuel control systems are configured to direct an enriched fuel flow through the primary pilot nozzle(s) of a small number of the fuel injectors. Unfortunately, primary pilot nozzles are typically configured to operate at a relatively low fuel flow number so as to provide the atomization required for low speed starts. As a result, an extremely large pressure drop is often necessary to inject the fuel flow required for an HPFC relight event through the primary pilot nozzles. Accordingly, engine designers must currently select between increasing the size of the fuel pump to provide the increased fuel pressure needed for such events (thereby, significantly increasing the overall weight of the system) or modifying the primary pilot nozzles to operate at higher fuel flow numbers (which negatively impacts the atomization for low-speed starting and operation near idle speed).

Accordingly, an improved fuel supply system that allows a portion of the fuel that would otherwise be supplied to a primary pilot nozzle to be diverted to another nozzle of the fuel injector so as to reduce the required pressure (and thus, the pump size) needed for fuel enrichment during a HPFC relight event or during any other suitable event would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for supplying fuel to fuel injectors of a combustor of a gas turbine engine. The system may generally include a fuel injector having a primary pilot fuel nozzle in fluid communication with a primary fuel circuit, a secondary pilot fuel nozzle in fluid communication with a secondary fuel circuit and a main fuel nozzle in fluid communication with a main fuel circuit. Each of the fuel circuits may extend at least partially within the fuel injector. In addition, the fuel injector may also define a by-pass fuel circuit fluidly connected between the primary fuel circuit and at least one of the secondary fuel circuit or the main fuel circuit. The system may also include a primary fuel manifold configured to be fluidly connected to the primary pilot fuel nozzle via the primary fuel circuit. Moreover, the system may include a by-pass valve provided in operative association with the by-pass fuel circuit. The by-pass valve may be configured to be opened such that a portion of the fuel flowing through the primary fuel circuit from the primary fuel manifold is directed to the secondary fuel circuit and/or the main fuel circuit.

In this aspect of the present subject matter, the by-pass fuel circuit may be fluidly connected between the primary fuel circuit and the secondary fuel circuit. In addition, the by-pass valve may be configured to be opened such that the portion of the fuel flowing through the primary fuel circuit is directed to the secondary fuel circuit and is subsequently delivered to the secondary pilot fuel nozzle.

Also in this aspect of the present subject matter, the system may include both a secondary fuel manifold configured to be fluidly connected to the secondary pilot fuel nozzle via the secondary fuel circuit and a secondary pilot valve internal to the fuel injector that is provided in operative association with the secondary fuel circuit so as to control the fuel supplied from the secondary fuel manifold to the secondary pilot fuel nozzle. In such an embodiment, the by-pass fuel circuit may, for example, be fluidly connected to the secondary fuel circuit at a location downstream from the secondary pilot valve.

Further in this aspect of the present subject matter, the by-pass fuel circuit may be fluidly connected between the primary fuel circuit and the main fuel circuit. In addition, the by-pass valve may be configured to be opened such that the portion of the fuel flowing through the primary fuel circuit is directed to the main fuel circuit and is subsequently delivered to the main fuel nozzle.

In this aspect of the present subject matter, the system may also include both a main fuel manifold configured to be fluidly connected to the main fuel nozzle via the main fuel circuit and a main valve internal to the fuel injector that is provided in operative association with the main fuel circuit so as to control the fuel supplied from the main fuel manifold to the main fuel nozzle. In such an embodiment, the by-pass fuel circuit may, for example, be fluidly connected to the main fuel circuit at a location downstream from the main valve.

Also in this aspect of the present subject matter, the by-pass valve may be housed within a valve housing of the fuel injector.

Further in this aspect of the present subject matter, the operation of the by-pass valve may be configured to be actively or passively controlled. For example, in one embodiment, the by-pass valve may correspond to an electronic valve configured to be opened upon receipt of a control signal. Alternatively, the by-pass valve may correspond to a pressure-activated valve configured to be opened when a fluid pressure within the primary fuel circuit exceeds a predetermined cracking pressure.

Also in this aspect of the present subject matter, the fuel injector may correspond to an enriched fuel injector and the primary fuel manifold may correspond to an enriched fuel manifold.

In another aspect, the present subject matter is directed to a system for supplying fuel to enriched fuel injectors of a combustor of a gas turbine engine. The system may generally include an enriched fuel injector having a primary pilot fuel nozzle in fluid communication with a primary fuel circuit, a secondary pilot fuel nozzle in fluid communication with a secondary fuel circuit and a main fuel nozzle in fluid communication with a main fuel circuit. Each of the primary, secondary and main fuel circuits may extend at least partially within the enriched fuel injector. In addition, the enriched fuel injector may further define a by-pass fuel circuit fluidly connected between the primary fuel circuit and at least one of the secondary fuel circuit or the main fuel circuit. The system may also include an enriched fuel manifold configured to be fluidly connected to the primary pilot fuel nozzle via the primary fuel circuit, a secondary fuel manifold configured to be fluidly connected to the secondary pilot fuel nozzle via the secondary fuel circuit and a main fuel manifold configured to be fluidly connected to the main fuel nozzle via the main fuel circuit. Moreover, the system may include a by-pass valve provided in operative association with the by-pass fuel circuit. The by-pass valve may be configured to be opened such that a portion of the fuel flowing through the primary fuel circuit from the enriched fuel manifold is directed to the secondary fuel circuit and/or the main fuel circuit.

In this aspect of the present subject matter, the system may also include a standard fuel injector and a standard fuel manifold. The standard fuel injector may include a second primary pilot fuel nozzle in fluid communication with the standard fuel manifold via a second primary fuel circuit, a second secondary pilot fuel nozzle in fluid communication with the secondary fuel manifold via a second secondary fuel circuit and a main fuel nozzle in fluid communication with the main fuel manifold via a second main fuel circuit.

Also in this aspect of the present subject matter, the standard fuel injector may further define a second by-pass circuit fluidly connected between the second primary fuel circuit and at least one of the second secondary fuel circuit or the second main fuel circuit.

Further in this aspect of the present subject matter, the system may also include a second by-pass valve provided in operative association with the second by-pass fuel circuit. The second by-pass valve may be configured to be opened such that a portion of the fuel flowing through the second primary fuel circuit from the standard fuel manifold is directed to the second secondary fuel circuit and/or the second main fuel circuit.

In a further aspect, the present subject matter is directed to a fuel injector for a combustor of a gas turbine engine. The fuel injector may generally include a primary fuel circuit in fluid communication with a primary pilot fuel nozzle of the fuel injector, a secondary fuel circuit in fluid communication with a secondary pilot fuel nozzle of the fuel injector and a main fuel circuit in fluid communication with a main fuel nozzle of the fuel injector. The primary fuel circuit may include a primary valve provided in operative association therewith for controlling a primary flow of fuel through the primary fuel circuit to the primary pilot fuel nozzle. The secondary fuel circuit may include a secondary valve provided in operative association therewith for controlling a secondary flow of fuel through the secondary fuel circuit to the secondary pilot fuel nozzle. The main fuel circuit may include a main valve provided in operative association therewith for controlling a main flow of fuel through the main fuel circuit to the main fuel nozzle. In addition, the fuel injector may also include a by-pass fuel circuit fluidly connected between the primary fuel circuit and at least one of the secondary fuel circuit or the main fuel circuit and a by-pass valve provided in operative association with the by-pass fuel circuit. The by-pass valve may be configured to be opened such that a portion of the primary flow of fuel flowing through the primary fuel circuit is directed to the secondary fuel circuit and/or the main fuel circuit.

In this aspect of the present subject matter, the by-pass fuel circuit may be fluidly connected to the secondary fuel circuit at a location downstream of the secondary valve. In addition, the by-pass valve may be configured to be opened such that the portion of the fuel flowing through the primary fuel circuit is directed to the secondary fuel circuit and is subsequently delivered to the secondary pilot fuel nozzle.

Also in this aspect of the present subject matter, the by-pass fuel circuit may be fluidly connected to the main fuel circuit at a location downstream of the main valve. In addition, the by-pass valve may be configured to be opened such that the portion of the fuel flowing through the primary fuel circuit is directed to the main fuel circuit and is subsequently delivered to the main fuel nozzle.

Further in this aspect of the present subject matter, the by-pass valve, the primary valve, the secondary valve and the main valve may be housed within a valve housing of the fuel injector.

In this aspect of present subject matter, operation of the by-pass valve may be configured to be actively or passively controlled. For example, in one embodiment, the by-pass valve may correspond to a pressure-activated valve configured to be opened when a fluid pressure within the primary fuel circuit exceeds a predetermined cracking pressure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
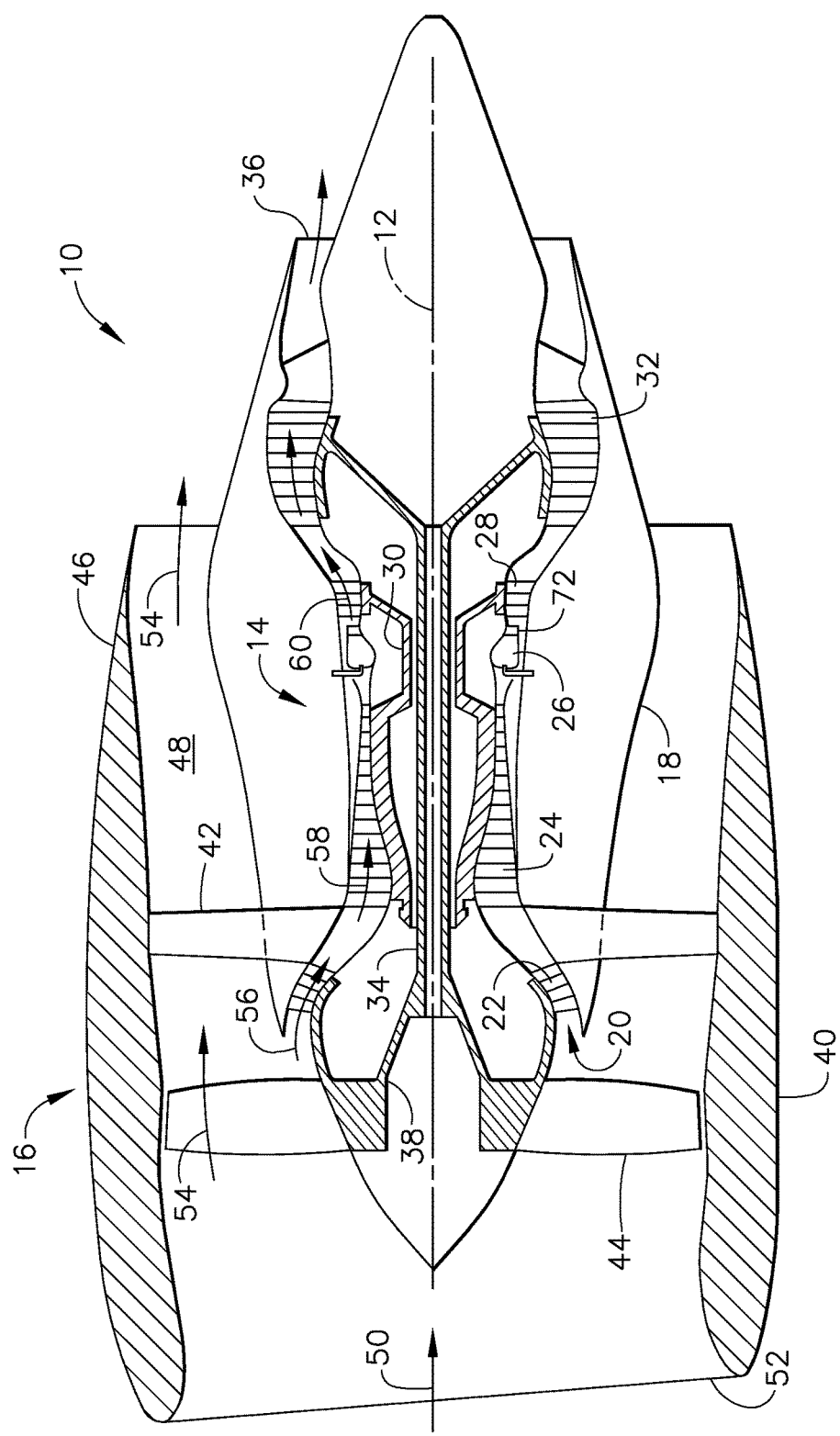
FIG. 1 illustrates a cross-sectional view of one embodiment of a gas turbine engine that may be utilized within an aircraft in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a fuel supply system for supplying fuel to the various fuel injectors within a combustor of a gas turbine engine. Specifically, in several embodiments, the system may include a by-pass fuel circuit and associated valve for diverting fuel from one internal fuel circuit of a fuel injector to another internal fuel circuit of the fuel injector. For example, as will be described below, each fuel injector may include a primary fuel circuit for supplying fuel to a primary pilot fuel nozzle of the injector, a secondary fuel circuit for supplying fuel to a secondary pilot fuel nozzle of the injector and at least one main fuel circuit for supplying fuel to a main fuel nozzle of the injector. In several embodiments, the by-pass circuit may be fluidly connected between the primary fuel circuit and the secondary fuel circuit and/or between the primary fuel circuit and the main fuel circuit. As such, a portion of the fuel being directed to the primary pilot nozzle via the primary fuel circuit may be diverted to the secondary pilot nozzle and/or the main nozzle.

Additionally, in several embodiments, the fuel injectors of the combustor may be divided into two separate sets of injectors, namely a plurality of standard fuel injectors and a plurality of enriched fuel injectors. In such embodiments, the disclosed system may include two common fuel manifolds and two injector-specific fuel manifolds for supplying fuel to the individual fuel circuits of the fuel injectors. Specifically, the system may include a common main fuel manifold in fluid communication with the main fuel circuit of each fuel injector and a common secondary fuel manifold in fluid communication with the secondary fuel circuit of each fuel injector. In addition, the system may include a standard fuel manifold in fluid communication solely with the primary fuel circuit of each standard fuel injector and an enriched fuel manifold in fluid communication solely with the primary fuel circuit of each enriched fuel injector. As a result, an enriched fuel flow may be supplied through the primary fuel circuit of each enriched fuel injector to provide for an increased fuel-to-air ratio within the combustor at or adjacent to the locations of the enriched fuel injectors.

As will be described below, in several embodiments, the by-pass circuit of the disclosed system may be included within each enriched fuel injector to allow a portion of the enriched fuel flowing through the primary fuel circuit to be diverted to the secondary fuel circuit and/or the main fuel circuit of the enriched fuel injector. By providing a means for diverting a portion of the enriched fuel flow to another nozzle(s), the disclosed system may allow for additional enriched fuel flow capacity to be provided to the enriched fuel injectors. For example, the disclosed system may allow for the increased fuel flow capacity needed to relight a gas turbine engine following an HPFC event to be supplied to the enriched fuel injectors without resulting in undesirable impacts on the fuel system and without requiring changes in the atomization performance of the pilot nozzles. Specifically, the enrichment level required for such an event may be preserved using the disclosed system without increasing the size of the associated fuel pump or the fluid pressure within the system while decreasing the pump pressure losses within the system and eliminating the need for a supplementary enriched fuel manifold.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor 38 that configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
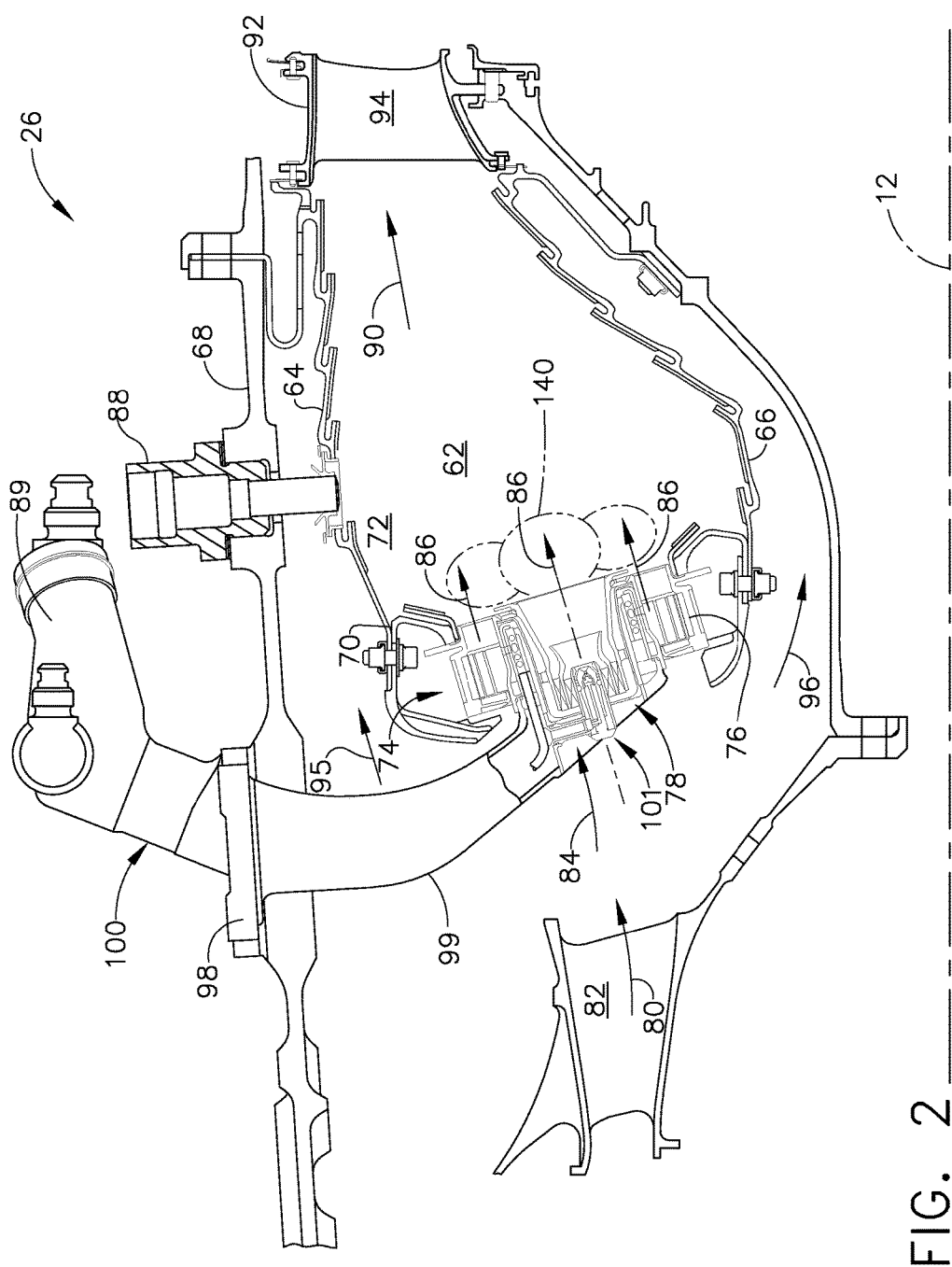
FIG. 2 illustrates a longitudinal, cross-sectional view of one embodiment of a combustor suitable for use within the gas turbine engine shown in FIG. 1.

Referring now to FIG. 2, a longitudinal, cross-sectional view of one embodiment of a combustor 26 suitable for use within the gas turbine engine 10 described above is illustrated in accordance with aspects of the present subject matter. As shown, the combustor 26 may include an annular combustion zone 62 defined between and by annular radially outer and inner liners 64, 66, respectively, circumscribed above the engine's longitudinal axis 12. In general, the outer and inner liners 64, 66 may be located radially inwardly from an annular combination casing 68 configured to extend circumferentially around the outer and inner liners 64, 66. In addition, the combustor 26 may also include an annular dome 70 mounted upstream of the combustion zone 62 that is configured to be coupled to the outer and inner liners 64, 66. As shown in FIG. 2, the dome 70 may define an upstream end 72 of the combustion zone 62. Moreover, a plurality of mixer assemblies 74 (only one of which shown) may be spaced circumferentially around the dome 70. As will be described below, each mixer assembly 74 may include a main mixer 76 and a pilot mixer 78.

Additionally, as shown in FIG. 2, the combustor 26 may be configured to receive an annular stream of pressurized compressor discharge air 80 from a discharge outlet 82 of the high pressure compressor 24. A first portion of the compressor discharge air (indicated by arrow 84) flows into the mixer assembly 74, within which fuel is injected and mixed with the pressurized air to form an air-fuel mixture that is subsequently delivered to the combustion zone 62 for combustion thereof. Ignition of the fuel-air mixture (indicated by arrows 86) may be accomplished by a suitable igniter(s) 88 (e.g., one or more igniters 88 extending through the outer liner 64), and the resulting combustion gases (indicated by arrow 90) may flow in an axial direction toward and into an annular, first stage turbine nozzle 92. As is generally understood, the nozzle 92 may be defined by an annular flow channel that includes a plurality of radially-extending, circularly-spaced nozzle vanes 94 that turn the gases so that they flow angularly and impinge upon the first stage turbine blades (not shown) of the first turbine 28 (FIG. 1). Additionally, as shown in FIG. 2, a second portion of the compressor discharge air 80 (indicated by arrow 95) may flow around the outer liner 64 and a third portion of the compressor discharge air 80 (indicated by 96) may flow around the inner liner 66.

Moreover, the combustor 26 may also include a plurality of fuel injectors 100 (one of which is shown), with each fuel injector 100 being fixed and sealed to the combustor casing 68 via a nozzle mount or flange 98. As shown in FIG. 2, the fuel injector 100 may include both a hollow stem 99 formed integral with or fixed to the flange 98 (such as by brazing or welding) and a fuel nozzle assembly 101. In several embodiments, the hollow stem 99 may be configured to support both the fuel nozzle assembly 101 and the pilot mixer 78. In addition, a valve housing 89 at the top of the stem 99 may be configured to contain one or more valves for controlling the amount of fuel supplied to the various nozzles of the fuel nozzle assembly 101. For instance, as will be described below with reference to FIG. 6, a primary pilot valve 210, a secondary pilot valve 212, a main valve 214 and a by-pass valve 232 may be housed within the valve housing 89 for controlling the supply of fuel to the fuel nozzle assembly 101.

Figure 3:
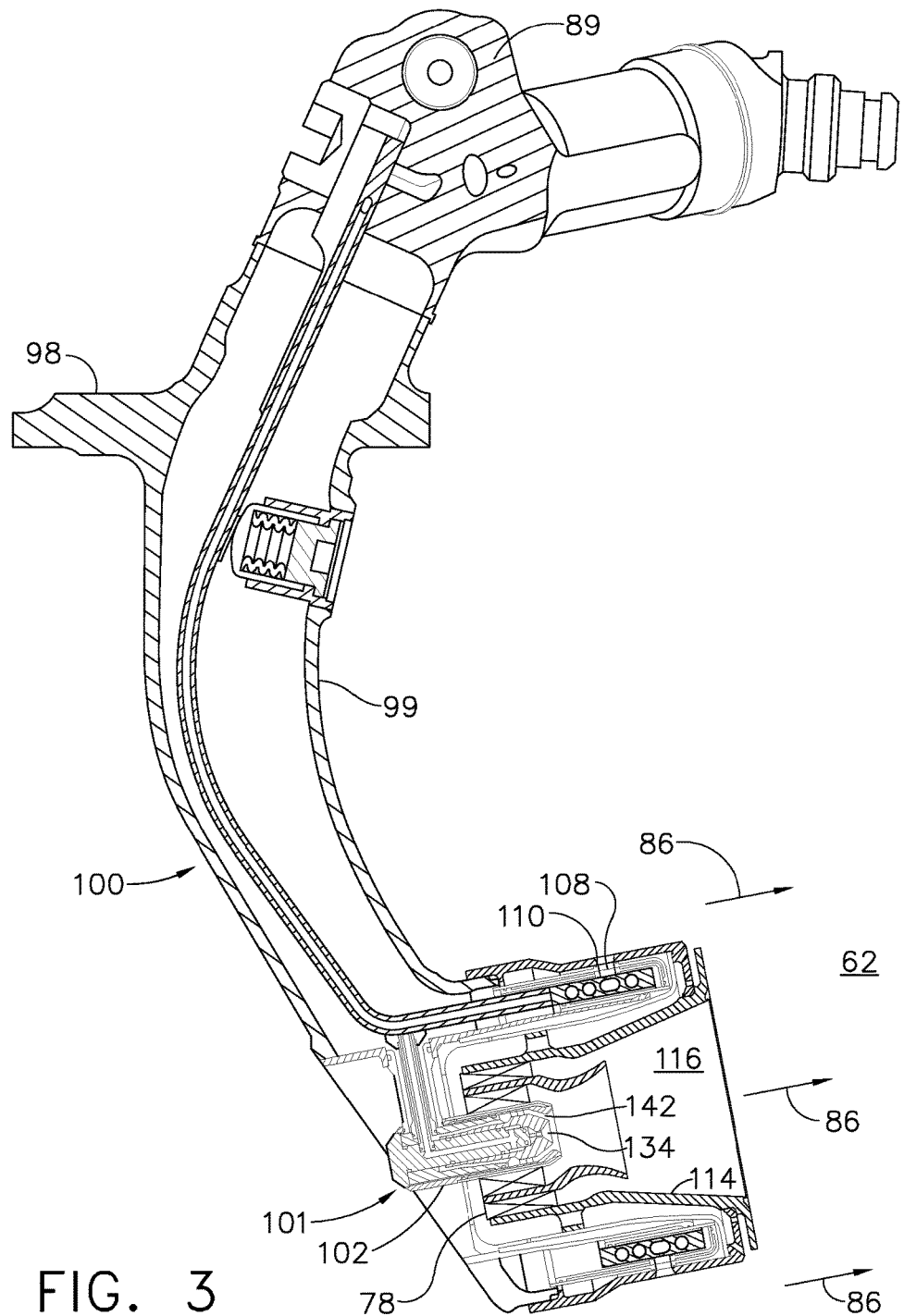
FIG. 3 illustrates a cross-sectional view of one embodiment of a fuel injector suitable for use within the combustor shown in FIG. 2.
Figure 4:
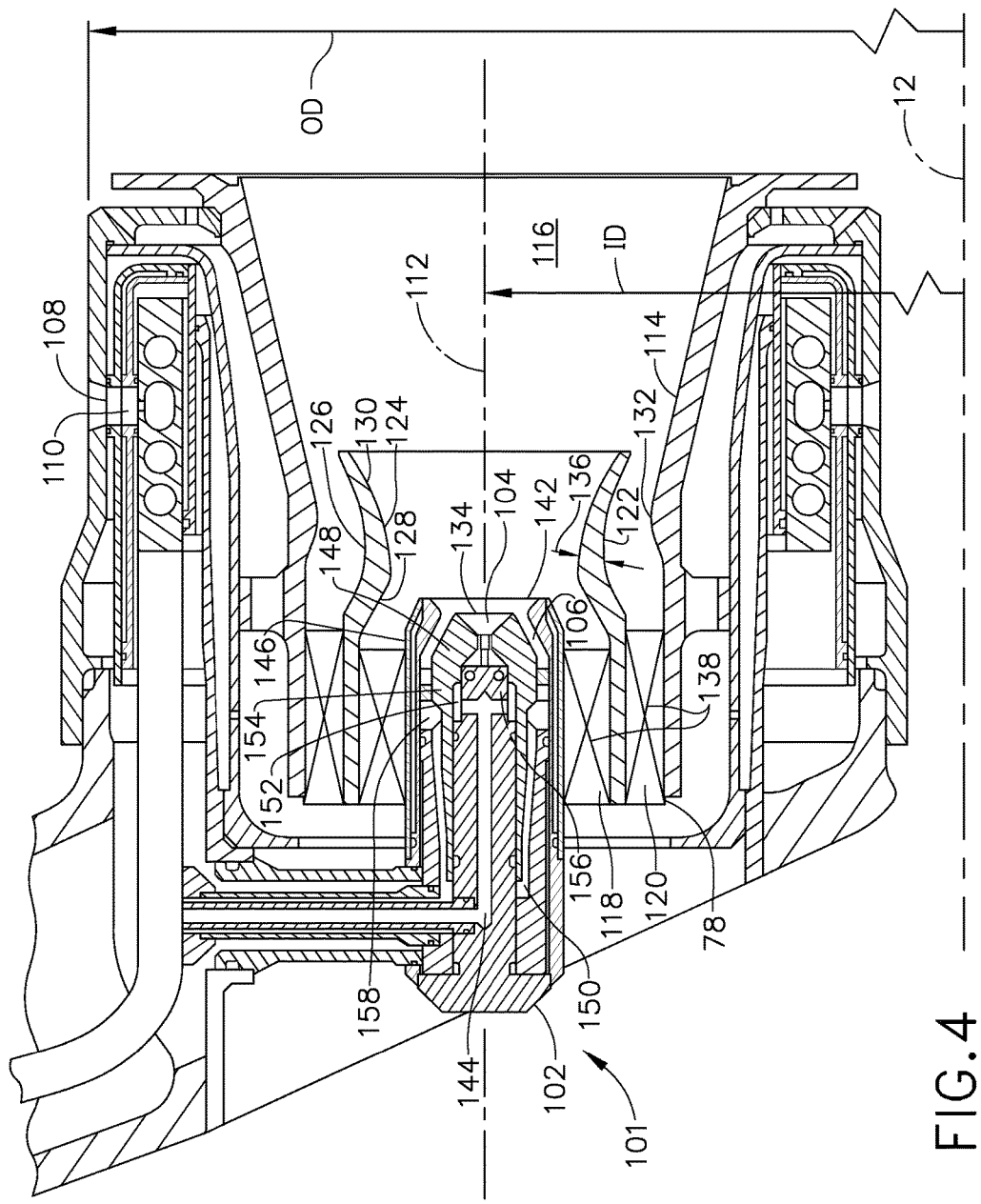
FIG. 4 illustrates a cross-sectional view of a portion of the fuel injector shown in FIG. 3, particularly illustrating various components of a fuel nozzle assembly of the fuel injector.

Referring now to FIGS. 3 and 4, differing views of various components of the combustor 26 shown in FIG. 2 are illustrated in accordance with aspects of the present subject matter. Specifically, FIGS. 3 and 4 illustrate differing cross-sectional views of components of the fuel injector 100 shown in FIG. 2, particularly illustrating various aspects of the fuel nozzle assembly 101 of the fuel injector 100.

As shown, in several embodiments, the fuel nozzle assembly 101 may include a dual orifice pilot fuel injector tip 102 having substantially concentric primary and secondary pilot fuel nozzles 104, 106 (FIG. 4). For example, as particularly shown in FIG. 4, the secondary pilot fuel nozzle 106 may be radially located directly adjacent to and surround the primary pilot fuel nozzle 104. In addition, the fuel nozzle assembly 101 may include a main fuel nozzle 108 spaced radially outwardly relative to the primary and secondary pilot fuel nozzles 104, 106. As shown in FIG. 4, each fuel nozzle assembly 101 may have a centerline axis 112 about which the primary and secondary pilot fuel nozzles 104, 106 and the main fuel nozzle 108 are circumscribed.

As is generally understood, the main fuel nozzle 108 and the primary and secondary pilot fuel nozzles 104, 106 may be used to deliver the air-fuel mixture 86 to the combustion zone 62. In this regard, the main fuel nozzle 108 may include a circular or annular array of radially outwardly open fuel injection orifices 110. Such orifices 110 may be in fluid communication with a corresponding main fuel circuit 208 (FIG. 6) extending at least partially within the fuel injector 100. As a result, the main fuel nozzle 108 may be operable to inject fuel in a generally radially outwardly direction through the circular array of radially outwardly open fuel injection orifices 110.

In addition, the primary and secondary pilot fuel nozzles 104, 106 may also be in fluid communication with corresponding primary and secondary fuel circuits 204, 206 (FIG. 6), respectively, extending at least partially within the fuel injector 100. As shown in FIGS. 3 and 4, the primary and secondary pilot fuel nozzles 104, 106 may have circular primary and annular secondary exits 134, 142 respectively, that are operable to inject fuel in a generally downstream direction (which may often be referred to as a dual orifice nozzle). To allow for such fuel injection, the primary fuel circuit may be in fluid communication with a primary fuel supply passage 144 that feeds fuel to a primary annular manifold 146 located adjacent to a downstream end 148 of the primary pilot fuel nozzle 104, with the fuel then being fed into a primary fuel swirler 156 positioned at the downstream end 148 prior to being expelled from the nozzle's exit 134. Similarly, the secondary fuel circuit may be in fluid communication with a secondary fuel supply passage 150 that flows fuel to a secondary annular manifold 152 located adjacent to a downstream end 154 of the secondary pilot fuel nozzle 106, with the fuel then being fed into a secondary fuel swirler 158 positioned at the downstream end 154 prior to being expelled from the nozzle's exit 142.

Additionally, as shown in the illustrated embodiment, a centerbody 114 may be radially disposed between the main fuel nozzle 108 and the primary and secondary pilot fuel nozzles 104, 106. As particularly shown in FIG. 3, the centerbody 114 may surround the pilot mixer 78 and define a chamber 116 that is configured to be in flow communication with, and downstream from, the pilot mixer 78. In addition, the pilot mixer 78 may radially support the dual orifice pilot fuel injector tip 102 at a radially inner diameter ID (FIG. 4) while the centerbody 114 may radially support the main fuel nozzle 108 at a radially outer diameter OD (FIG. 4). As shown, the main fuel nozzle 108 may be disposed within the main mixer 76 of the mixer assembly 74 while the dual orifice pilot fuel injector tip 102 may be disposed within the pilot mixer 78.

In general, the pilot mixer 78 may include a first pilot swirler 118 located radially outwardly of and adjacent to the dual orifice pilot fuel injector tip 102, a second pilot swirler 120 located radially outwardly of the first swirler 118, and a splitter 122 positioned therebetween. The splitter 122 may generally extend downstream of the dual orifice pilot fuel injector tip 102 and a venturi 124 may be formed in a downstream portion 126 of the splitter 122. As shown in FIG. 4, the venturi 124 may include a converging section 128, a diverging section 130, and a throat 132 therebetween. The throat 132 may be located downstream of the primary exit 134 of the primary pilot fuel nozzle 104. The splitter 122 may also have a wall thickness 136 that tapers down aft or downstream of the throat 132 through the converging section 128.

Additionally, as shown in the illustrated embodiment, the first and second pilot swirlers 118, 120 may generally be oriented parallel to the centerline axis 112 of the dual orifice pilot fuel injector tip 102 and the mixing assembly 74 may include a plurality of swirling vanes 138 (illustrated schematically in FIG. 4) for swirling air traveling therethrough. As is generally understood, fuel and air may be provided to pilot mixer 78 at all times during the engine operating cycle so that a primary combustion zone 140 (shown in FIG. 2) is produced within a central portion of combustion zone 62.

It should be appreciated that the configuration of the gas turbine engine 10 described above, particularly with reference to the configuration of the fuel nozzle assembly 101, has been illustrated and described herein simply to provide one example of a suitable turbine configuration within which the disclosed fuel supply system may be advantageously utilized. However, in other embodiments, the present subject matter may be advantageously utilized within a gas turbine engine having any other suitable configuration, including an engine having any other suitable arrangement and/or configuration of fuel nozzles to which fuel must be supplied (e.g., any other suitable arrangement and/or configuration of the primary pilot fuel nozzle 104, the secondary pilot fuel nozzle 106 and/or the main fuel nozzle 108 described above).

Figure 5:
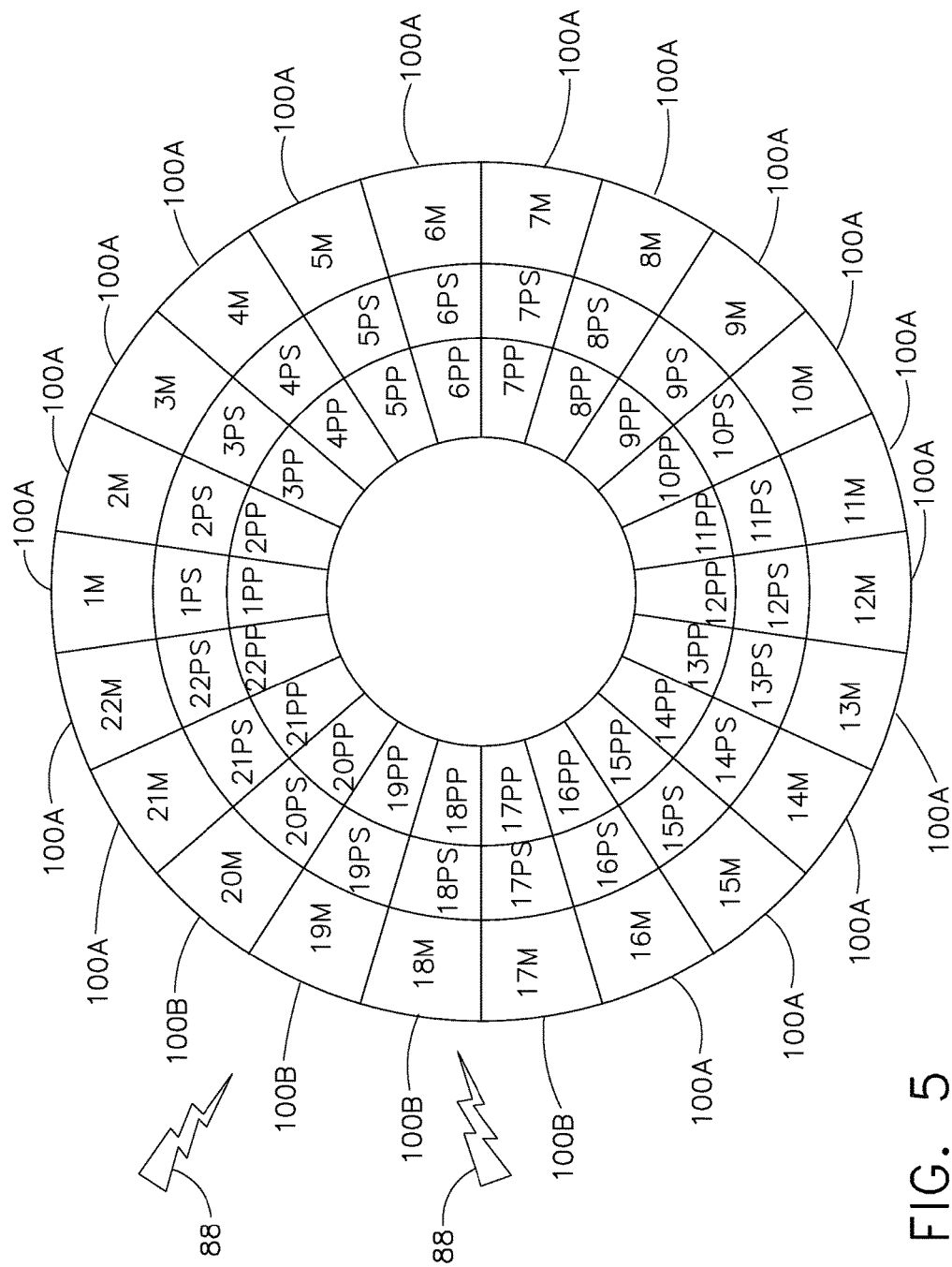
FIG. 5 illustrates a schematic view of one embodiment of a suitable staging configuration for various fuel injectors included within a combustor of a gas turbine engine.

Referring now to FIG. 5, a schematic view of one embodiment of a suitable staging configuration for the plurality of fuel injectors 100 included within a combustor 26 is illustrated in accordance with aspects of the present subject matter. Specifically, in several embodiments, the combustor 26 may include an annular array of fuel injectors 100. For example, in the embodiment shown in FIG. 5, the combustor 26 includes twenty-two fuel injectors 100. However, in other embodiments, the combustor 26 may include any other suitable number of fuel injectors 100.

As indicated above, each fuel injector 100 may include a fuel nozzle assembly 101 having a primary pilot fuel nozzle 104 (indicated as PP in FIG. 5) a secondary pilot fuel nozzle 106 (indicated as PS in FIG. 5) and a main fuel nozzle 108 (indicated as M in FIG. 5). In several embodiments, two separate sets of fuel injectors 100 may be used for staging within the combustor 26, namely a first set of fuel injectors 100A (hereinafter referred to as standard fuel injectors 100A) and a second set of fuel injectors 100B (hereinafter referred to as enriched fuel injectors 100B). As shown in the illustrated embodiment, the combustor includes eighteen standard fuel injectors 100A and four enriched fuel injectors 100B. However, in other embodiments, the combustor may include any other combination of standard and enriched fuel injectors 100A, 100B, such as having more or less than four enriched fuel injectors 100B.

In several embodiments, the enriched fuel injectors 100B may be located adjacent to the igniter(s) 88 of the combustor 26. In such embodiments, any combination of the nozzles included within the enriched fuel injectors 100B may be configured to receive an enriched fuel flow so as to provide for an increased fuel-to-air ratio region at or adjacent to the igniter(s) 88. Such an enriched fuel flow may be required, for example, at start-up of the gas turbine engine 10 or during relight of the engine 10 (e.g., following an HPFC event).

Figure 6:
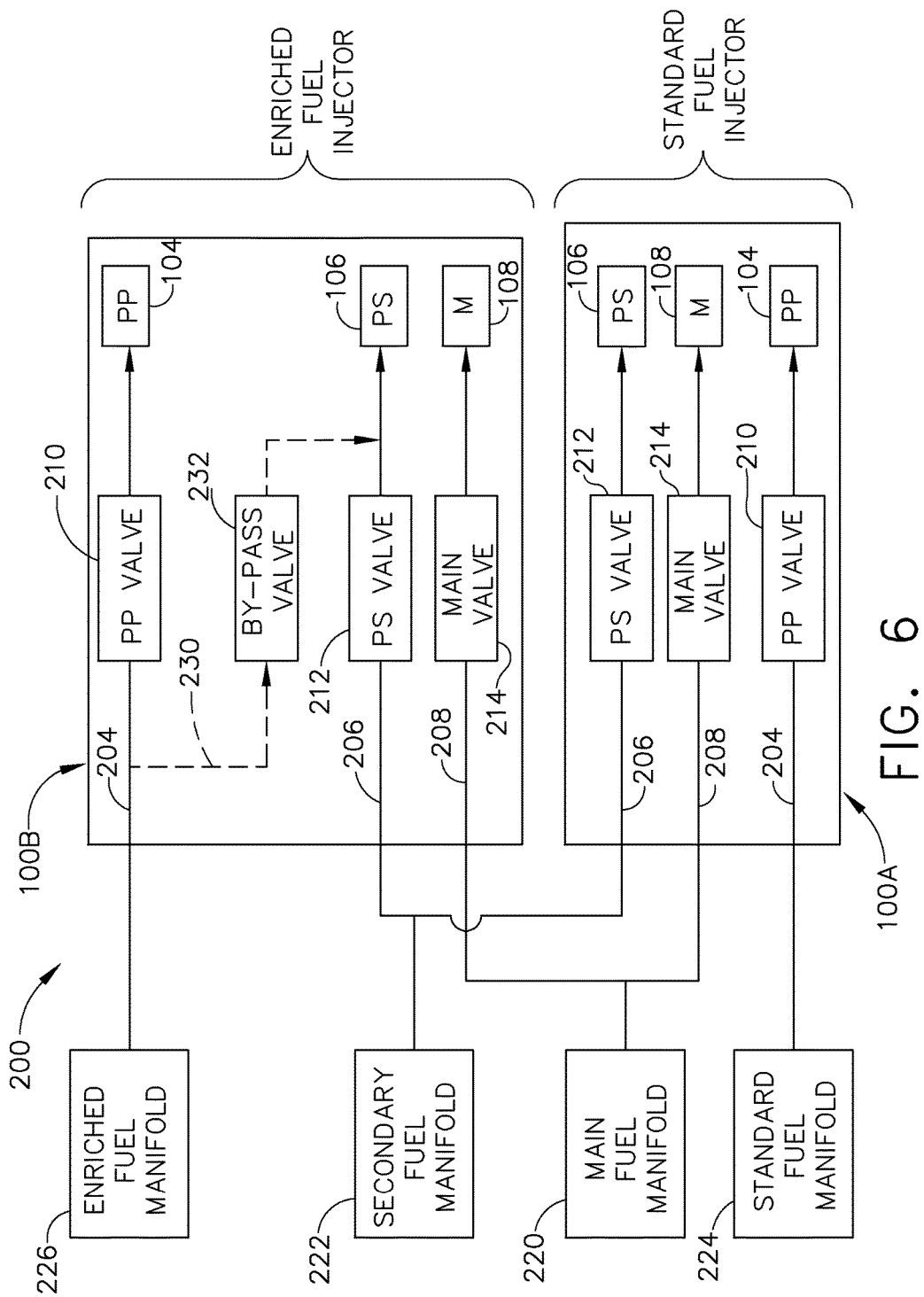
FIG. 6 illustrates one embodiment of a fuel supply system for supplying fuel to the fuel injectors of a combustor in accordance with aspects of the present subject matter.

Referring now to FIG. 6, a schematic diagram of one embodiment of a fuel supply system 200 for supplying fuel to the plurality of fuel injectors 100A, 100B of a combustor 26 is illustrated in accordance with aspects of the present subject matter. To simplify the illustration, the various manifolds of the fuel supply system 200 are shown in FIG. 6 as being fluidly connected to the individual fuel circuits associated with one of the standard fuel injectors 100A and one of the enriched fuel injectors 100B. Those of ordinary skill in the art should readily appreciate that the same fuel manifolds may also be used to supply fuel to the fuel circuits associated with the other fuel injectors 100A, 100B contained within the combustor 26 using the same manifold/circuit configuration shown in FIG. 5.

As shown, each fuel injector 100A, 100B may be in fluid communication with and/or at least partially house three separate fuel circuits 204, 206, 208, namely a primary fuel circuit 204 for directing fuel to the primary pilot fuel nozzle 104, a secondary fuel circuit 206 for directing fuel to the second pilot fuel nozzle 106 and a main fuel circuit 208 for directing fuel to the main fuel nozzle 108. In addition, each fuel injector 100A, 100B may include one or more valves 210, 212, 214 provided in operative association with each fuel circuit 204, 206, 208 for controlling the flow of fuel supplied to each respective nozzle 104, 106, 108. For example, as shown, each fuel injector 100A, 100B may include a primary pilot valve 210 for controlling the amount of fuel supplied through the primary fuel circuit 204 to the primary pilot fuel nozzle 104 and a secondary pilot valve 212 for controlling the amount of fuel supplied through the secondary fuel circuit 206 to the secondary pilot fuel nozzle 106. Similarly, each fuel injector 100A, 100B may include a main valve 214 for controlling the amount of fuel supplied through the main fuel circuit 208 to the main fuel nozzle 108. As indicated above, such valves 210, 212, 214 may be housed within the valve housing 89 of each fuel injector 100A, 100B.

Additionally, as shown in FIG. 6, the disclosed system 200 may include four separate fuel manifolds 220, 222, 224, 226 for supplying fuel to the various fuel circuits of the fuel injectors 100A, 100B. Specifically, the system 200 may include a main fuel manifold 220 in fluid communication with the main fuel circuit 208 of each fuel injector 100A, 100B and a secondary manifold 222 in fluid communication with the secondary fuel circuit 206 of each fuel injector 100A, 100B. In addition, the system 200 may include a standard fuel manifold 224 and an enriched fuel manifold 226 for supplying fuel to the primary fuel circuits 204 of the standard and enriched fuel injectors 100A, 100B, respectively. Specifically, as shown in FIG. 6, the standard fuel manifold 224 may be in fluid communication with the primary fuel circuits 204 of the various standard fuel injectors 100A to allow fuel from such manifold 224 to be directed to the primary pilot fuel nozzle 104 of each standard fuel injector 100A (e.g., the eighteen primary pilot fuel nozzles 104 (PP) associated with the standard fuel injectors 100A shown in FIG. 5). Similarly, the enriched fuel manifold 226 may be in fluid communication with the primary fuel circuits 204 of the various enriched fuel injectors 100B to allow fuel from such manifold 226 to be directed to the primary pilot fuel nozzle 104 of each enriched fuel injector 100B (e.g., the four primary pilot fuel nozzles 104 (PP) associated with the enriched fuel injectors 100B shown in FIG. 5).

Additionally, in accordance with aspects of the present subject matter, each enriched fuel injector 100B may include a by-pass fuel circuit 230 (indicated by dashed lines in FIG. 6) in fluid communication with the enriched fuel manifold 226. Specifically, as shown in FIG. 6, in several embodiments, the by-pass fuel circuit 230 may be fluidly connected between the primary pilot circuit 204 and the secondary fuel circuit 206 to allow a portion of the enriched fuel flow supplied from the enriched fuel manifold 226 to be directed into the flow of fuel being supplied to the secondary pilot fuel nozzle 106. As a result, the by-pass fuel circuit 230 may provide a means for increasing the fuel flow capacity to the secondary pilot fuel nozzle 106 (and a means for increasing the enriched fuel flow capacity to the fuel injector 100B as a whole), which may be particularly advantageous during start-up and/or relight events (e.g., following an HPFC event).

As shown in FIG. 6, to control the flow of enriched fuel supplied to the secondary fuel circuit 206, a by-pass valve 232 may be provided in operative association with the by-pass fuel circuit 230. In several embodiments, the by-pass valve 232 may correspond to an electronic valve configured to be actively controlled. For example, the by-pass valve 232 may correspond to a solenoid-activated, pressure regulating valve that is configured to proportionally control the pressure of the fuel supplied through the by-pass fuel circuit 230. In such an embodiment, suitable control signals may be transmitted to the by-pass valve 232 for controlling its operation. For instance, when it is desired to split the enriched fuel flow between the primary and secondary pilot fuel nozzles 104, 106, a suitable control signal may be transmitted to open the valve 232, thereby allowing a portion of the enriched fuel flow to be directed through the by-pass fuel circuit 230 and into the secondary fuel circuit 206.

Alternatively, the operation of the by-pass valve 232 may be configured to be passively controlled. For example, in several embodiments, the by-pass valve 232 may correspond to a pressure activated valve (e.g., a spring-biased bleed valve). In such embodiments, the by-pass valve 232 may be configured to open when the pressure of the enriched fuel flow exceeds a predetermined cracking pressure, thereby allowing a portion of the enriched fuel flow to be directed through the by-pass fuel circuit 230 and into the secondary fuel circuit 206. For example, in one embodiment, the cracking pressure may be selected as a pressure that exceeds the fuel pressure of the enriched fuel flow during normal operation of the associated gas turbine engine 10 but is less than the required fuel pressure for atypical or non-normal operating events. For instance, for certain gas turbine engine configurations, the fuel pressure of the fuel supplied through each primary fuel circuit 204 may be less than 530 pounds-per-square-inch differential (psid) for normal operation whereas the fuel pressure may exceed 1500 psid when it is necessary to force a sufficient amount of enriched fuel through the primary pilot fuel nozzles 104 for an HPFC relight event. In such instance, the cracking pressure may be selected as a pressure ranging between 530 psid and 1500 psid to allow the valve 232 to be opened during an HPFC relight event such that a portion of the enriched fuel flow is supplied to the secondary pilot fuel nozzle 106 of each enriched fuel injector 100B. For example, in one embodiment, the cracking pressure may range from about 550 psid to about 1200 psid, such as from about 560 psid to about 900 psid or from about 580 psid to about 700 psid or from about 590 psid to about 610 psid and any other subranges therebetween.

As shown in FIG. 6, the by-pass circuit 230 is fluidly connected to the primary fuel circuit 204 at a location upstream of the primary valve 210 and is fluidly connected to the secondary fuel circuit 206 at a location downstream of the secondary valve 212. As such, the fuel directed through the by-pass circuit 230 and into the secondary fuel circuit 206 may serve as supplementary fuel to the regulated amount of fuel provided to the secondary pilot fuel nozzle 106 from the secondary fuel manifold 22 via control of the secondary valve 212.

Figure 7:
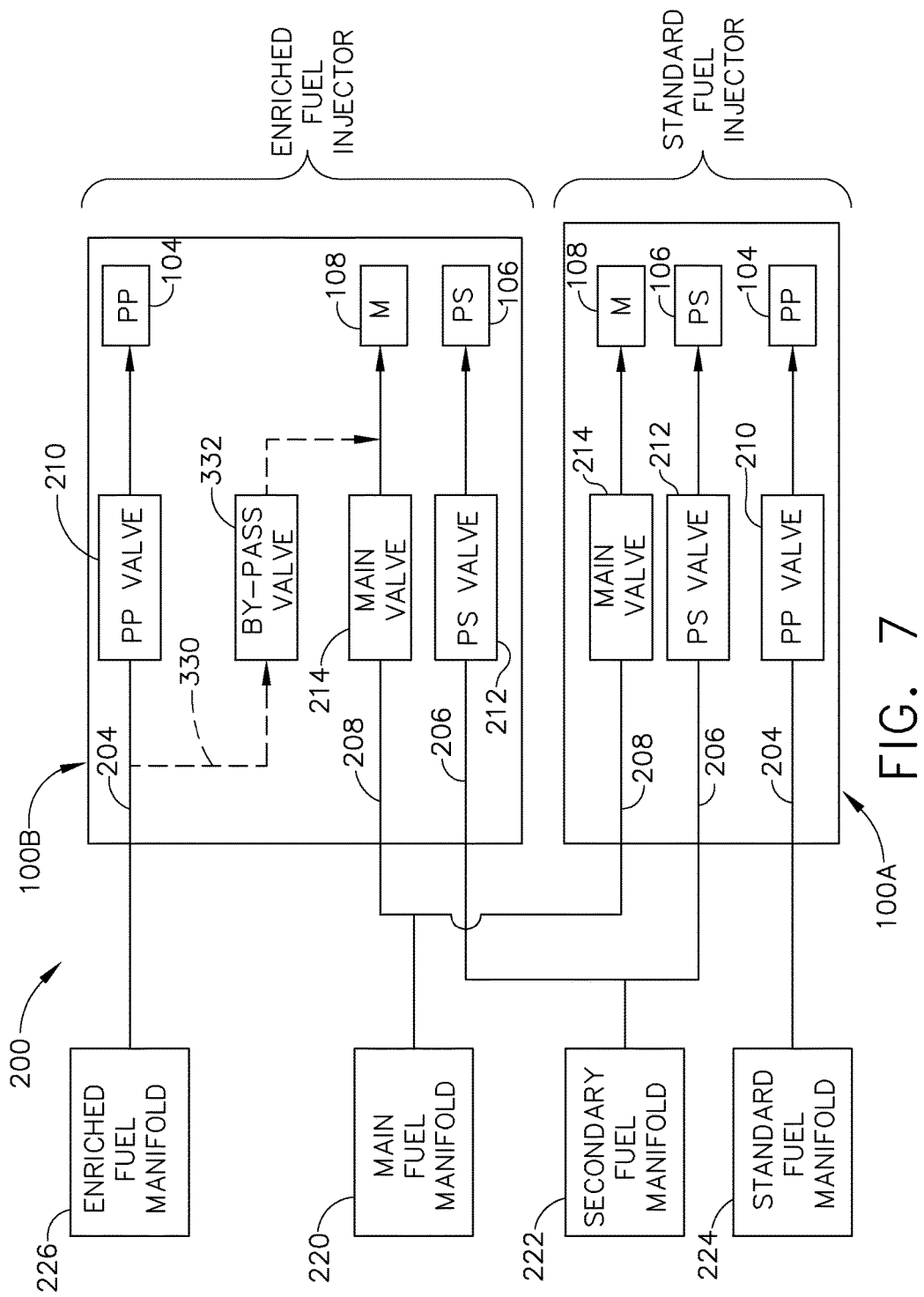
FIG. 7 illustrates another embodiment of the fuel supply system shown in FIG. 6.

Referring now to FIG. 7, another embodiment of the system 200 shown in FIG. 6 is illustrated in accordance with aspects of the present subject matter. As shown, each enriched fuel injector 100B may include a by-pass fuel circuit 330 (indicated by dashed lines in FIG. 7) in fluid communication with the enriched fuel manifold 226. However, unlike the embodiment of the system 200 described above, the by-pass fuel circuit 330 is fluidly connected between the primary pilot circuit 204 and the main circuit 208 to allow a portion of the enriched fuel flow supplied from the enriched fuel manifold 226 to be directed into the flow of fuel being supplied to the main fuel nozzle 108. As a result, the by-pass fuel circuit 330 may provide a means for increasing the fuel flow capacity to the main fuel nozzle 108.

Similar to the embodiment described above, the system 200 may also include a by-pass valve 332 provided in operative association with the by-pass fuel circuit 330 that is configured to control the flow of enriched fuel supplied to the main fuel circuit 208. As such, the by-pass valve 332 may generally correspond to any suitable valve capable of regulating the flow of fuel through the by-pass circuit 230, such as an electronic valve configured to be actively controlled or a passively controlled valve (e.g., a pressure-activate valve)

As shown in FIG. 7, the by-pass circuit 330 is fluidly connected to the primary fuel circuit 204 at a location upstream of the primary valve 210 and is fluidly connected to the main fuel circuit 208 at a location downstream of the main valve 214. As such, the fuel directed through the by-pass circuit 330 and into the main fuel circuit 208 may serve as supplementary fuel to the regulated amount of fuel provided to the main fuel nozzle 108 from the main fuel manifold 220 via control of the main valve 214.

It should be appreciated that, in alternative embodiments, the by-pass fuel circuit 230, 330 may be configured to provide a means for supplying a portion of the enriched fuel flow to both the secondary pilot fuel nozzle 106 and the main fuel nozzle 108. For instance, in one embodiment, a single by-pass valve 232, 332 may be configured to control the supply of fuel through the by-pass circuit 230, 330, with the fuel circuit 230, 330 splitting downstream of the valve 232, 332 to allow a supply of enriched fuel to be directed to both the secondary fuel circuit 206 and the main fuel circuit 208 of each enriched fuel injector 100B. In another embodiment, two separate by-pass valves 232, 332 may be provided within each enriched fuel injector 100B to allow the supply of enriched fuel directed to the secondary and main fuel circuits 206, 208 to be individually controlled.

Figure 8:
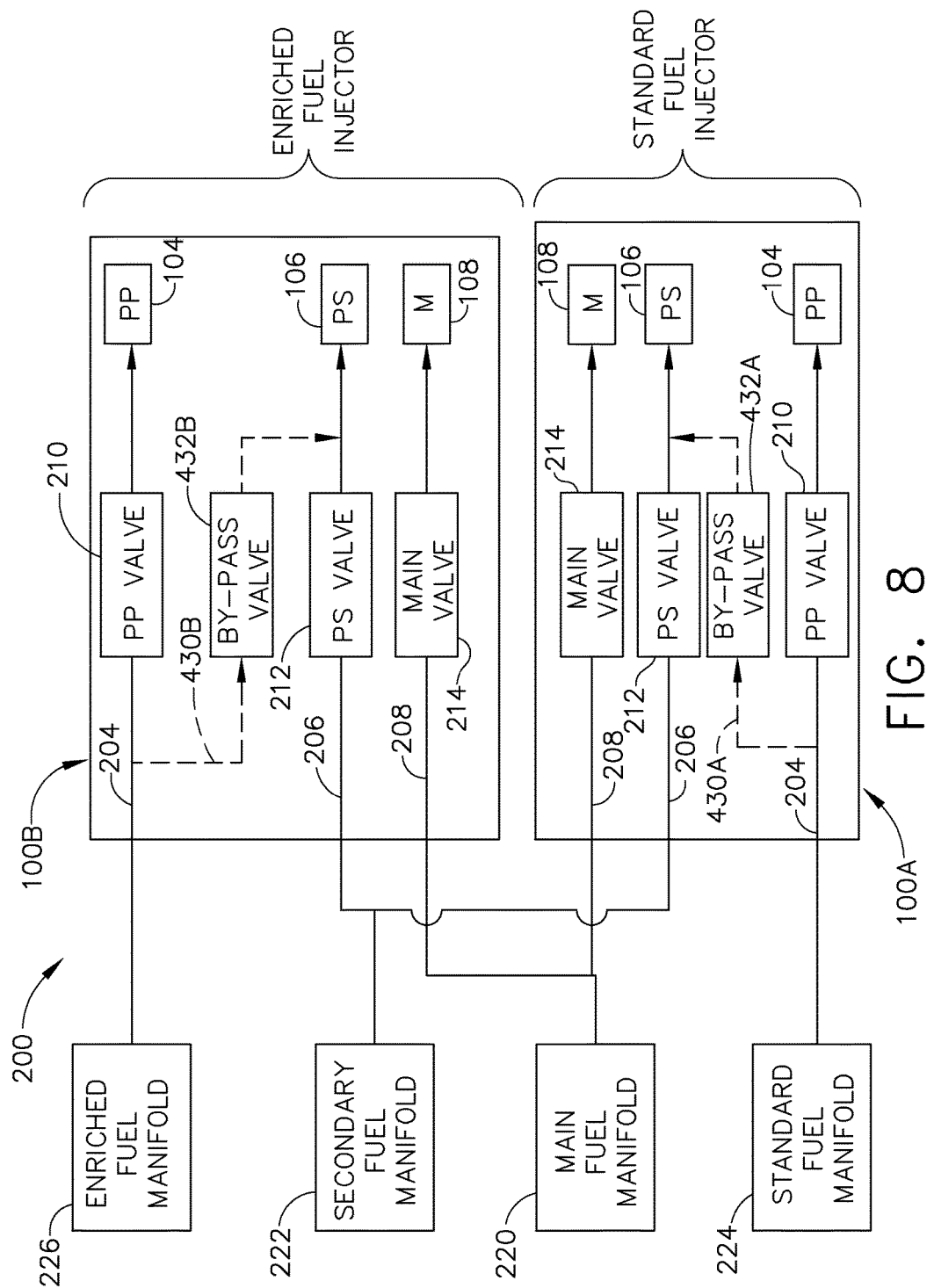
FIG. 8 illustrates a further embodiment of the fuel supply system shown in FIG. 6.

Referring now to FIG. 8, yet another embodiment of the system 200 shown in FIG. 6 is illustrated in accordance with aspects of the present subject matter. As shown, unlike the embodiments described above, each fuel injector 100A, 100B includes a by-pass fuel circuit 430A, 430B (indicated by dashed lines in FIG. 8) in fluid communication with its respective primary fuel circuit 204. Specifically, each standard fuel injector 100A may include a first by-pass circuit 430A (and associated by-pass valve 432A) for by-passing a portion of the fuel supplied from the standard fuel manifold 224 to another nozzle of the injector 100A. Similarly, each enriched fuel injector 100B may include a second by-pass circuit 430B (and associated by-pass valve 432B) for by-passing a portion of the fuel supplied from the enriched fuel manifold 226 to another nozzle of the injector 100B. In the illustrated embodiment, both by-pass circuits 430A, 430B are fluidly connected between the primary pilot circuit 204 and the secondary pilot circuit 206 of each fuel injector 100B. However, in other embodiments, the by-pass circuits 430A, 430B may be utilized to provide a fluid connection between the primary pilot circuit 204 and the main circuit 208 (e.g., similar to that shown in FIG. 7) or a fluid connection between the primary pilot circuit 204 and both the secondary pilot circuit 206 and the main circuit 208.

Figure 9:
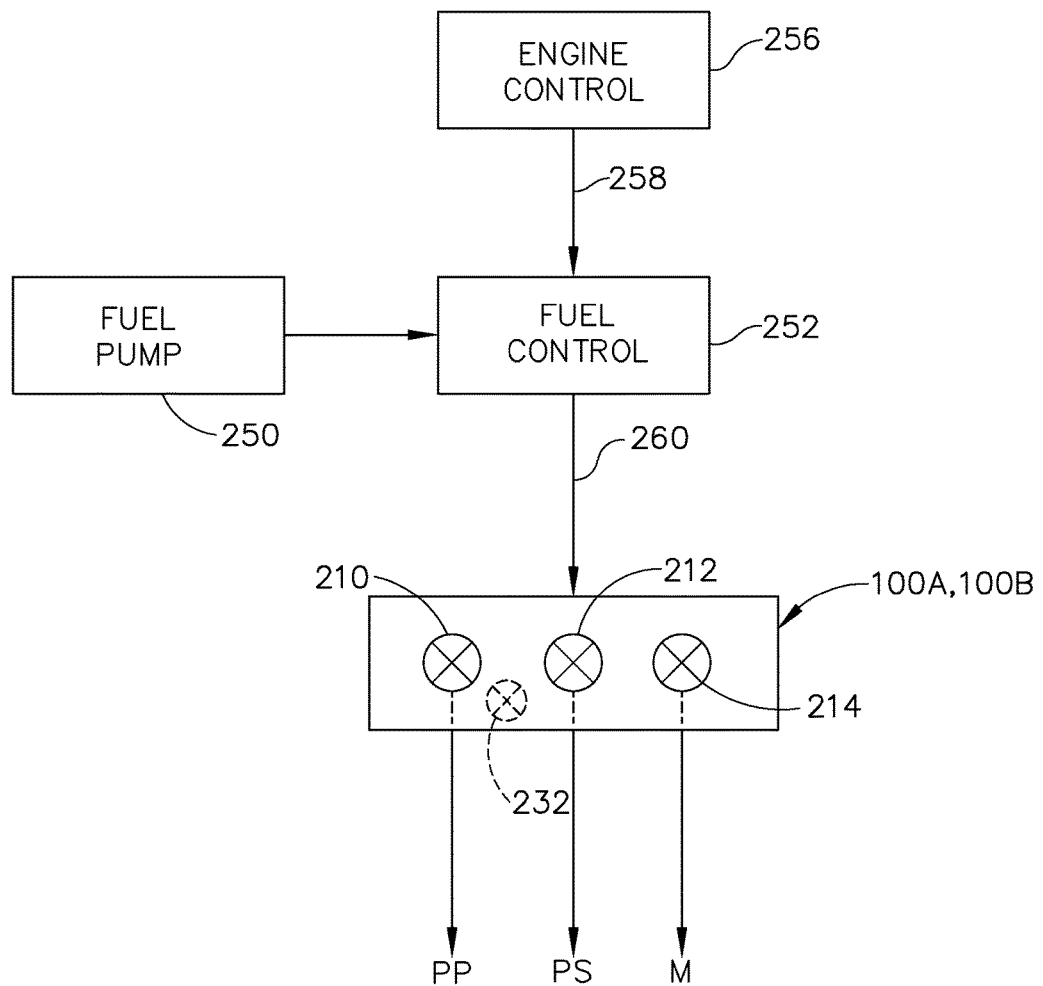
FIG. 9 illustrates various components that may be included within the disclosed fuel supply system for controlling the supply of fuel through the various fuel circuits of each fuel injector.

Referring now to FIG. 9, a schematic diagram of various components that may be included within the disclosed system 200 for controlling the flow of fuel supplied to and/or within each fuel injector 100A, 100B is illustrated in accordance with aspects of the present subject matter. As shown, a fuel pump 250 may be provided in association with each fuel manifold (e.g., the main fuel manifold 220, the secondary fuel manifold 222, the standard fuel manifold 224 and the enriched fuel manifold 226) for pressurizing the fuel supplied to each fuel injector 100A, 100B. In addition, a fuel control device 252 may be provided for each fuel injector 100A, 100B for controlling the valves associated with each fuel circuit within the fuel injector 100A, 100B and, therefore, the amount of fuel supplied to each fuel nozzle. For example, as shown in FIG. 9, the fuel control device 252 may be communicatively coupled to the primary valve 210, the secondary valve 212 and the main valve 214 for controlling the amount of fuel supplied to the primary pilot fuel nozzle 104, the secondary pilot fuel nozzle 106 and the main fuel nozzle 108, respectively. Moreover, in embodiments in which the by-pass valve 232, 332, 432 is configured to be actively controlled, the fuel control device 252 may also be communicatively coupled to the by-pass valve 232, 332, 432 for controlling the flow of fuel through its corresponding by-pass circuit 230, 330, 43.

In several embodiments, the fuel control device 252 may be configured to interface with both the fuel pump 250 and a corresponding engine control device 256 in order to carefully regulate the amount of fuel supplied to the various nozzles within each fuel injector 100A, 100B. For example, the engine control device 256 may be configured to transmit suitable control signals 258 to the fuel control device 252 associated with the current operating mode and/or the current operating requirements of the gas turbine engine 10. The fuel control device 252 may then, in turn, transmit suitable control signals 260 to the various valves for controlling the fuel supplied to each nozzle.

It should be appreciated that, in several embodiments, the fuel control device 252 and the engine control device 256 may be implemented using a single controller associated with the gas turbine engine 10 or two or more controllers communicatively coupled to one another. For instance, in one embodiment, the fuel control device 242 may correspond to a fuel controller of the gas turbine engine 10 and the engine control device 256 may correspond to a separate, engine controller of the gas turbine engine 10.

It should also be appreciated that, as used herein, the term "controller" generally refers to any suitable computing device and/or processing unit known in the art. As such, a controller described herein may, for example, include one or more processor(s) and associated memory device(s) configured to perform a variety of computer-implemented functions (e.g., performing the various functions described herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) included within a given controller may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the associated controller to perform various functions, such as transmitting the valve control signals described above.

Additionally, it should be appreciated that, as described herein, the various embodiments of the system 200 include a single main fuel circuit 208 for supplying fuel to the main fuel nozzle 108. However, in other embodiments, the system 200 may include a dual main fuel circuit including both a first main fuel circuit and a second main fuel circuit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for supplying fuel to fuel injectors of a combustor of a gas turbine engine, the system comprising:
   a fuel injector including a primary pilot fuel nozzle in fluid communication with a primary fuel circuit, a secondary pilot fuel nozzle in fluid communication with a secondary fuel circuit and a main fuel nozzle in fluid communication with a main fuel circuit, each of the primary, secondary and main fuel circuits extending at least partially within the fuel injector, the fuel injector further defining a by-pass fuel circuit fluidly connected between the primary fuel circuit and at least one of the secondary fuel circuit or the main fuel circuit;
   a primary fuel manifold configured to be fluidly connected to the primary pilot fuel nozzle via the primary fuel circuit;
   a by-pass valve provided in operative association with the by-pass fuel circuit, the by-pass valve being configured to be opened such that a portion of the fuel flowing through the primary fuel circuit from the primary fuel manifold is directed to the at least one of the secondary fuel circuit or the main fuel circuit; and
   further comprising an enriched fuel injector and an enriched fuel manifold, the enriched fuel injector including a second primary pilot fuel nozzle in fluid communication with the enriched fuel manifold via a second primary fuel circuit, a second secondary pilot fuel nozzle in fluid communication with a secondary fuel manifold via a second secondary fuel circuit and a second main fuel nozzle in fluid communication with a main fuel manifold via a second main fuel circuit;
   wherein the enriched fuel injector further defines a second by-pass circuit fluidly connected between the second primary fuel circuit and at least one of the second secondary fuel circuit or the second main fuel circuit.

2. The system of claim 1, wherein the by-pass fuel circuit is fluidly connected between the primary fuel circuit and the secondary fuel circuit, the by-pass valve configured to be opened such that the portion of the fuel flowing through the primary fuel circuit is directed to the secondary fuel circuit and is subsequently delivered to the secondary pilot fuel nozzle.

3. The system of claim 1, wherein the by-pass valve is housed within a valve housing of the fuel injector.

4. The system of claim 1, wherein operation of the by-pass valve is configured to be actively or passively controlled.

5. The system of claim 4, wherein the by-pass valve corresponds to an electronic valve configured to be opened upon receipt of a control signal.

6. The system of claim 4, wherein the by-pass valve corresponds to a pressure-activated valve configured to be opened when a fluid pressure within the primary fuel circuit exceeds a predetermined cracking pressure.

7. A system for supplying fuel to enriched fuel injectors of a combustor of a gas turbine engine, the system comprising:
   an enriched fuel injector including a primary pilot fuel nozzle in fluid communication with a primary fuel circuit, a secondary pilot fuel nozzle in fluid communication with a secondary fuel circuit and a main fuel nozzle in fluid communication with a main fuel circuit, each of the primary, secondary and main fuel circuits extending at least partially within the enriched fuel injector, the enriched fuel injector further defining a by-pass fuel circuit fluidly connected between the primary fuel circuit and at least one of the secondary fuel circuit or the main fuel circuit;
   an enriched fuel manifold configured to be fluidly connected to the primary pilot fuel nozzle via the primary fuel circuit;
   a secondary fuel manifold configured to be fluidly connected to the secondary pilot fuel nozzle via the secondary fuel circuit;
   a main fuel manifold configured to be fluidly connected to the main fuel nozzle via the main fuel circuit;
   a by-pass valve provided in operative association with the by-pass fuel circuit, the by-pass valve being configured to be opened such that a portion of the fuel flowing through the primary fuel circuit from the enriched fuel manifold is directed to the at least one of the secondary fuel circuit or the main fuel circuit; and
   further comprising a standard fuel injector and a standard fuel manifold, the standard fuel injector including a second primary pilot fuel nozzle in fluid communication with the standard fuel manifold via a second primary fuel circuit, a second secondary pilot fuel nozzle in fluid communication with the secondary fuel manifold via a second secondary fuel circuit and a second main fuel nozzle in fluid communication with the main fuel manifold via a second main fuel circuit;
   wherein the standard fuel injector further defines a second by-pass fuel circuit fluidly connected between the second primary fuel circuit and at least one of the second secondary fuel circuit or the second main fuel circuit.

8. The system of claim 7, further comprising a second by-pass valve provided in operative association with the second by-pass fuel circuit, the second by-pass valve being configured to be opened such that a portion of the fuel flowing through the second primary fuel circuit from the standard fuel manifold is directed to the at least one of the second secondary fuel circuit or the second main fuel circuit.

9. A fuel injector for a combustor of a gas turbine engine, the fuel injector comprising:
   a primary fuel circuit in fluid communication with a primary pilot fuel nozzle of the fuel injector, the primary fuel circuit including a primary valve provided in operative association therewith for controlling a primary flow of fuel through the primary fuel circuit to the primary pilot fuel nozzle;
   a secondary fuel circuit in fluid communication with a secondary pilot fuel nozzle of the fuel injector, the secondary fuel circuit including a secondary valve provided in operative association therewith for controlling a secondary flow of fuel through the secondary fuel circuit to the secondary pilot fuel nozzle;
   a main fuel circuit in fluid communication with a main fuel nozzle of the fuel injector, the main fuel circuit including a main valve provided in operative association therewith for controlling a main flow of fuel through the main fuel circuit to the main fuel nozzle;
   a by-pass fuel circuit fluidly connected between the primary fuel circuit and at least one of the secondary fuel circuit or the main fuel circuit;
   a by-pass valve provided in operative association with the by-pass fuel circuit, the by-pass valve being configured to be opened such that a portion of the primary flow of fuel flowing through the primary fuel circuit is directed to the at least one of the secondary fuel circuit or the main fuel circuit; and further comprising an enriched fuel injector and an enriched fuel manifold, the enriched fuel injector including a second primary pilot fuel nozzle in fluid communication with the enriched fuel manifold via a second primary fuel circuit, a second secondary pilot fuel nozzle in fluid communication with a secondary fuel manifold via a second secondary fuel circuit and a second main fuel nozzle in fluid communication with a main fuel manifold via a second main fuel circuit;

wherein the enriched fuel injector further defines a second by-pass fuel circuit fluidly connected between the second primary fuel circuit and at least one of the second secondary fuel circuit or the second main fuel circuit.

10. The fuel injector of claim 9, wherein the by-pass fuel circuit is fluidly connected to the secondary fuel circuit at a location downstream of the secondary valve, the by-pass valve configured to be opened such that the portion of the fuel flowing through the primary fuel circuit is directed to the secondary fuel circuit and is subsequently delivered to the secondary pilot fuel nozzle.

11. The fuel injector of claim 9, wherein the by-pass valve, the primary valve, the secondary valve and the main valve are housed within a valve housing of the fuel injector.

12. The fuel injector of claim 9, wherein operation of the by-pass valve is configured to be actively or passively controlled.

13. The fuel injector of claim 12, wherein the by-pass valve corresponds to a pressure-activated valve configured to be opened when a fluid pressure within the primary fuel circuit exceeds a predetermined cracking pressure.

* * * * *